Aug. 15, 1933.  E. O. ERICKSON  1,922,535
METHOD OF PRODUCING QUARTZ SEALS
Filed June 16, 1930
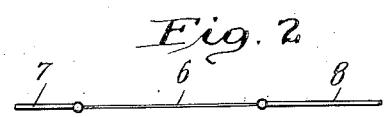
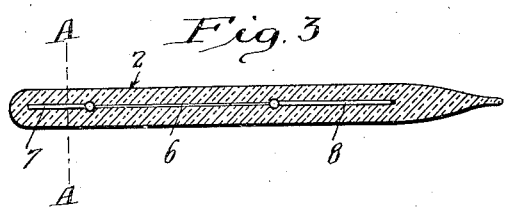
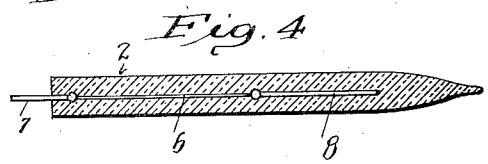
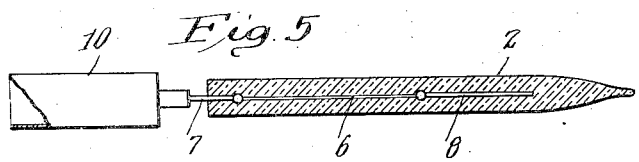
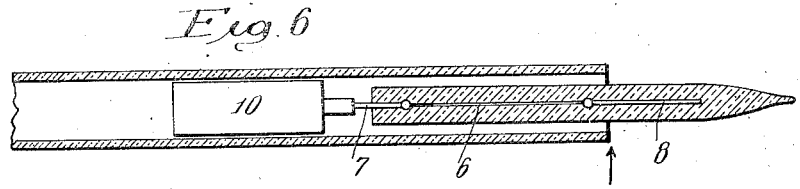
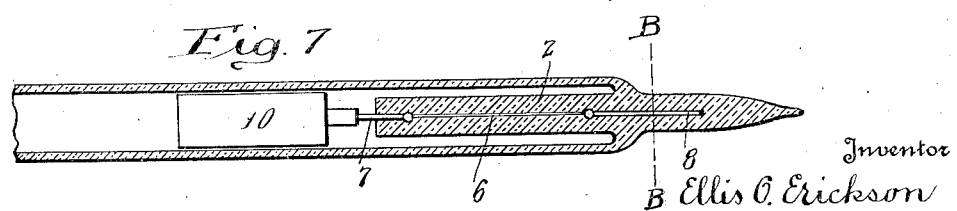
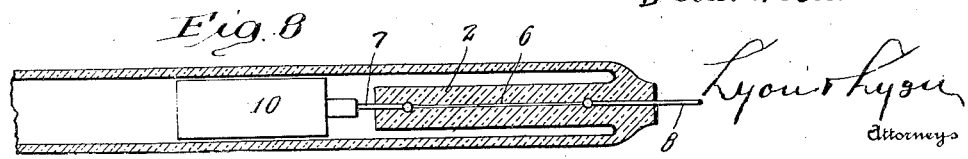
Inventor
Ellis O. Erickson
Lyon & Lyon
Attorneys Patented Aug. 15, 1933

1,922,535

UNITED STATES PATENT OFFICE 1,922,535

METHOD OF PRODUCING QUARTZ SEALS

Ellis O. Erickson, Los Angeles, Calif., assignor to Claude Neon Electrical Products Corporation, Ltd., Wilmington, Del. a Corporation of Delaware Application June 16, 1930. Serial No. 461,351

5 Claims. (Cl. 49—78.1)

This invention relates to a quartz seal and to a method of producing the same. In various quartz apparatus it is desired to pass a metallic wire into the vessel and form an air-tight seal around the wire. Thus, in certain vacuum apparatus neon tubes, etc. electrodes, filaments or other parts within the tube are desired to be provided with a lead line for making electrical connections. It is necessary that these lead lines be sealed to the quartz with a substantially air-tight seal. Since the coefficient of expansion of quartz is so widely different from any metal which can be utilized as such a lead line conduit, it is extremely difficult to effect a satisfactory seal because of the fact that the quartz requires such a high temperature i. e., 1700 to 1750° C. before it can be worked. The difficulties of forming the seal are great and the number of metals suitable for use as a seal are extremely limited.

It is the purpose of the present invention to provide a seal for passing a metal lead line through quartz and a process of producing the same which is satisfactory in practice and simple and economical to use and construct.

Generally considered, the invention comprehends that by providing a very fine diameter wire in a portion of the lead line and over a sufficient length the quartz may be caused to seal sufficiently tight to said wire as to eliminate practically all leakage. The invention also comprehends a construction and process of constructing such a seal which is simple to carry out and which assures against the metal in this fine lead line being vaporized from and broken during operations of forming a seal into the desired finished apparatus.

The invention also provides a seal which is formed independently of and which is separate from the apparatus into which it is to be finally sealed and provided a form of seal which may be readily welded in place in the desired apparatus in a simple manner without danger of destruction of the seal.

The invention also provides a form of seal especially suitable for connecting the electrodes of Geisler tubes such as neon tubes, when the tube is to be made of quartz. Neon or Geisler tubes made of quartz are of special value as therapeutic lamps.

The present invention together with various additional objects and advantages will best be understood from the description of a preferred form or example of a quartz seal and process of producing the same embodying the invention. The seal and process are illustrated by reference to the accompanying drawing, in which Figure 1 is a sectional view of a capillary used in forming a seal.

Figure 2 is an illustration of the lead wire utilized in the seal.

Figure 3 is a seal unit or blank.

Figure 4 is the blank after it is operated upon for attaching an electrode.

Figure 5 illustrates the seal attached to the electrode.

Figure 6 illustrates the position of the seal and electrode in a tube before the operation of combining the seal with the tube so that the seal may function in the apparatus of which the tube is a part.

Figure 7 illustrates the seal after it has been welded to the tube.

Figure 8 illustrates the seal with its outer end removed in order that electrical connections may be made.

Fig. 9 is a sectional view of the capillary and lead wire assembled and connected to an evacuating pump.

Referring to the drawing:

In preparing the seal I prefer to employ a capillary section 2 having one end 3 with a narrow bore closed at its end. The narrow bore for example is preferably one millimeter in diameter. The narrow bore portion of the capillary connects with a larger bore section 4 and then with an enlargement 5 which may serve as a nipple for attaching the capillary to the hose of a vacuum pump.

In Figure 2 there is illustrated a wire which is to form a lead to an electrical part and with which the seal is to be made. The wire comprises a central section 6 of a very fine diameter which, for example, is .0006 inches in diameter. This wire must be made of metal having a melting point higher than that of quartz and preferably of high tensile strength, and tungsten is the metal I have generally chosen as best for filling these requirements and also being one which is commercially available in this small diameter. The length of the section 6 of the lead wire should be sufficient to insure an adequate seal. Generally speaking, the larger the diameter the longer length necessary to insure a seal, while the smaller the diameter the less length. I have found in practice that with a .0006 inch diameter tungsten wire of ¾ inch in length a seal of quartz may be produced which fails to register any leakage. To the ends of this section 6 of wire there should be welded lead lines 7 and 8 of a flexible wire and of larger diameter. The material of the leads to the sealing wire 6 may be varied, but the requirement for the use of a metal having a melting point higher than that of quartz and also of substantially flexible nature, even after having been subjected to high temperatures at which quartz is worked, has led to the selection of molybdenum. While the diameter of the leads 7 and 8 is not critical, I have for example, employed molybdenum in .015 inches in diameter.

In the process of making the seal, the wire shown in Figure 2 is placed within the narrow bore of capillary 2 and the capillary 2 is then connected with a hose 9, as shown in Figure 9, leading to a vacuum pump. The capillary is then heated between the lines M—M and N—N in Figure 9 until the quartz is sufficiently soft that under the vacuum it will be collapsed upon the wire. Finally, the section including the wire is fused off forming the unit illustrated in Figure 3.

The capsule should hang in a vertical position during the collapsing operation and is preferably clamped in that position by means of a clamp about the rubber tube at a point where the capsule enters it. The heating is preferably by a hand torch and is started preferably about the line N—N and the heating progressed slowly upward to the line M—M as the lower portions of the capsules are collapsed.

By this process the unit shown in Figure 3 is produced in which the wire of Figure 2 has been completely embedded in quartz.

In order to connect the electrode or other electrical elements with the seal, one end of the seal is then fractured at about the line A—A in Figure 3 and removed from the end of the wire by a fracturing pressure, leaving the seal in the form shown in Figure 4. To the seal is then attached the electrode indicated at 10, the particular electrode indicated being a cylindrical electrode and forming a part of a neon tube. The wire from this electrode is attached to the wire of a seal by a crimp joint or by spot welding. This produces the unit illustrated in Figure 5.

Then, as illustrated in Figure 6, when the seal is to be connected into the apparatus in which it is to be used, the seal of Figure 5 with its electrode is placed within a quartz tube so that the outermost joint between the tungsten and molybdenum wires is at about ⅛ inch from the open end. The quartz tube is then welded to the seal by directing a small pointed flame to the point indicated by the arrow in Figure 6. Since the wire of the seal is entirely surrounded and enclosed by quartz at the region that this welding operation is performed, the high temperature of the welding operation is unable to vaporize the metal of the wire and accordingly, the seal is preserved and the wire preserved continues so that it is capable of acting as a conductor.

This operation produces a seal as shown in Figure 7. This seal is then marked along the line B—B and fractured and the excess removed by crushing, leaving the finished seal as shown in Figure 8. In the finished seal one end of molybdenum wire protrudes as illustrated, and can be utilized for making electrical connections. Molybdenum does not solder readily but a hook can be made in the end of the wire and embedded in a drop of solder in the end of the metal cap. An optional method of connection is to spot weld a connection of Dumet wire and then to solder to the Dumet.

While the process of making a seal herein illustrated and the seal are well adapted to carry out the objects of this invention, various modifications and changes may be made without departing from the principles and objects of the invention and this invention includes all such changes and modifications as come within the scope of the appended claims.

I claim:

1. A process of making a quartz seal with an electrode which comprises, connecting to a fine wire relatively larger short lead wires, inserting the combined wire in a quartz capillary, heating and collapsing the quartz capillary around the wire to entirely enclose the same, fracturing one end of the capillary to expose one of the lead wires connecting the electrode therewith, inserting the electrode of the capillary in a quartz tube, fusing the quartz tube to the other end of the capillary, and finally fracturing said end of the capillary to expose the other lead wire.

2. A process of making a quartz seal which comprises, joining a fine wire to tungsten with short flexible leads, inserting the combined wire thus provided with a quartz capillary, heating and collapsing the quartz capillary to entirely enclose the wire, fracturing the capillary at one end and connecting an electrode to the exposed lead, welding a quartz tube to the other end of the capillary, and finally fracturing said end to expose the lead wire.

3. A process of making a quartz seal for an electrode which comprises, connecting a short section of fine tungsten wire to relatively larger short leads of molybdenum, inserting the same into a quartz capillary, heating and collapsing the capillary to entirely enclose the same, then fracturing one end and connecting an electrode therewith, inserting the electrode and collapsed capillary in a quartz tube, welding the quartz tube to the unfractured end of the collapsed capillary, and fracturing the end to expose the lead wire.

4. A process of forming a seal between a quartz envelope and an electrical lead wire which consists in inserting a fine metallic wire in a quartz capillary having one end thereof closed, evacuating said capillary, heating and collapsing the capillary on the wire while under vacuum to completely enclose the wire in the quartz, fracturing one end of the quartz to expose one end of the wire, attaching an electrode to said exposed wire end, inserting the electrode and collapsed capillary into the quartz envelope, welding the envelope to the capillary near the closed end thereof, and fracturing the closed end of said capillary to expose the other end of said wire.

5. The process of making a seal between a quartz envelope and an electrical lead wire, which consists in forming a lead wire by attaching a heavy metallic wire to each end of a length of fine metallic wire, inserting said wire assembly into a quartz capillary having one end thereof closed, evacuating said capillary, heating and collapsing said capillary while under vacuum over the entire length of said wire assembly, fracturing one end of said capillary to expose an end of the heavy wire, securing an electrode to said exposed wire end, inserting said electrode and said collapsed capillary into a quartz envelope, welding said quartz envelope to said capillary near the unfractured end of said capillary, and fracturing the end of said capillary beyond said weld to expose the end of said other heavy wire.

ELLIS O. ERICKSON.